US009063745B2

(12) United States Patent
Jayaramappa et al.

(10) Patent No.: US 9,063,745 B2
(45) Date of Patent: Jun. 23, 2015

(54) COMPUTING REUSABILITY INDEX OF SOFTWARE ASSETS

(75) Inventors: Mohan Jayaramappa, Bangalore (IN); Sivaramakrishnan Suresh, Bangalore (IN)

(73) Assignee: Tata Consultancy Services Limited (IN)

( * ) Notice: Subject to any disclaimer, the term of this patent is extended or adjusted under 35 U.S.C. 154(b) by 182 days.

(21) Appl. No.: 13/427,039

(22) Filed: Mar. 22, 2012

(65) Prior Publication Data

US 2013/0167115 A1 Jun. 27, 2013

(30) Foreign Application Priority Data

Dec. 22, 2011 (IN) .......................... 3621/MUM/2011

(51) Int. Cl.
*G06F 9/44* (2006.01)
(52) U.S. Cl.
CPC .. *G06F 8/36* (2013.01); *G06F 8/71* (2013.01); *G06F 8/77* (2013.01)
(58) Field of Classification Search
CPC ............ G06F 11/1435; G06F 17/3023; G06F 17/30309; G06F 9/3834; G06F 17/2288; G06F 8/71
See application file for complete search history.

(56) References Cited

U.S. PATENT DOCUMENTS

| | | | | |
|---|---|---|---|---|
| 7,353,496 B2 * | 4/2008 | Kimura et al. | ................ | 717/121 |
| 7,747,987 B1 * | 6/2010 | Akarte et al. | ................ | 717/131 |
| 8,495,569 B2 * | 7/2013 | Yoshimura et al. | ........... | 717/120 |
| 2002/0069400 A1 * | 6/2002 | Miloushev et al. | ........... | 717/108 |
| 2002/0194578 A1 * | 12/2002 | Irie et al. | ....................... | 717/122 |
| 2004/0133879 A1 * | 7/2004 | Yoshimura et al. | ........... | 717/120 |
| 2004/0172612 A1 * | 9/2004 | Kasravi et al. | ................ | 717/101 |
| 2006/0117306 A1 * | 6/2006 | Kimura et al. | ................ | 717/141 |
| 2008/0040705 A1 * | 2/2008 | Jeong | ............................ | 717/122 |
| 2009/0089753 A1 * | 4/2009 | Yoshimura et al. | ........... | 717/121 |
| 2009/0138292 A1 * | 5/2009 | Dusi et al. | ......................... | 705/7 |
| 2009/0164974 A1 * | 6/2009 | Corsetti et al. | ................ | 717/123 |
| 2010/0115492 A1 * | 5/2010 | Yoshimura et al. | ........... | 717/120 |
| 2010/0269099 A1 * | 10/2010 | Yoshimura et al. | ........... | 717/122 |

OTHER PUBLICATIONS

Hironori Washizaki et al., A metrics suite for measuring reusability of software components, 2003 IEEE, 13 pages, <http://ieeexplore.ieee.org/xpls/abs_all.jps?arnumber=1232469&tag=1>.*

(Continued)

*Primary Examiner* — Thuy Dao
*Assistant Examiner* — Cuong V Luu
(74) *Attorney, Agent, or Firm* — Banner & Witcoff, Ltd.

(57) ABSTRACT

A method and a system for computing a reusability index of a software asset are provided. The system comprises a processor and a memory coupled to the processor. The memory comprises a characteristics module, a dimensions module, and a reusability module. The characteristics module is configured to receive a characteristic score for each of a plurality of predefined characteristics associated with the software asset. The dimensions module is configured to determine, based on the characteristic score weighted according to a characteristic weighing criterion, a dimension score for each of a plurality of predefined dimensions, wherein each of the plurality of predefined dimensions comprises at least one of the plurality of predefined characteristics. The reusability module is configured to compute, based on the dimension score weighted according to a dimension weighing criterion, the reusability index of the software asset.

20 Claims, 3 Drawing Sheets

(56) References Cited

OTHER PUBLICATIONS

Katsuro Inoue et al.; Ranking Significance of Software Components Based on Use Relations; 2005 IEEE; pp. 213-225; <http://ieeexplore.ieee.org/stamp/stamp.jsp?tp=&arnumber=1423993>.*

John S. Osmundson et al.; Quality management metrics for software development; 2001 Elsevier; pp. 799-812; <http://www.sciencedirect.com/science/article/pii/S0378720602001143#>.*

Paul D. Scott et al.; Ranking reusability of software components using coupling metrics; 2006 Elsevier; pp. 1450-1459; <http://www.sciencedirect.com/science/article/pii/S0164121206002998>.*

Victor R. Basili et al; How Reuse Influences Productivity in Object-Oriented Systems; 1996 ACM; pp. 104-116; <http://dl.acm.org/citation.cfm?id=236184>.*

Ruben Prieto-Diaz; Implementing faceted classification for software reuse; 1991 ACM; pp. 88-97; <http://dl.acm.org/citation.cfm?id=103176>.*

Harith Alani et al.; Metrics for Ranking Ontologies; 2006 University of Southampton; 7 pages; <http://eprints.soton.ac.uk/262603/1/Alani-EON06.pdf>.*

\* cited by examiner

COMPUTING REUSABILITY INDEX OF SOFTWARE ASSETS

TECHNICAL FIELD

The present subject matter described herein, in general, relates to software reuse, and more particularly to computing reusability index of software assets.

BACKGROUND

Software reuse has become widely accepted as a cost-effective approach in software development. The software reuse approach emphasizes software development using reusable software assets. Many software development organizations have benefited from the software reuse approach by reducing the time and cost of software development as well as improving the quality of developed software.

In large software development organizations that spend numerous man-hours on software development in various technologies and domains, the repository of reusable software assets is likely to be very large over a period of time. When searching the repository of reusable software assets against a set of functional and technical requirements, generally a large number of search results are obtained. To maximize the benefits of reuse, the best reusable software asset has to be chosen from among the large number of search results.

SUMMARY

This summary is provided to introduce concepts related to systems and methods for computing reusability index of software assets and the concepts are further described below in the detailed description. This summary is not intended to identify essential features of the claimed subject matter nor is it intended for use in determining or limiting the scope of the claimed subject matter.

In one implementation, a system for computing a reusability index of a software asset is provided. The system comprises a processor and a memory coupled to the processor. The memory comprises a characteristics module, a dimensions module, and a reusability module. The characteristics module is configured to receive a characteristic score for each of a plurality of predefined characteristics associated with the software asset. The dimensions module is configured to determine, based on the characteristic score weighted according to a characteristic weighing criterion, a dimension score for each of a plurality of predefined dimensions, wherein each of the plurality of predefined dimensions comprises at least one of the plurality of predefined characteristics. The reusability module is configured to compute, based on the dimension score weighted according to a dimension weighing criterion, the reusability index of the software asset, wherein the reusability index indicates reusability of the software asset.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Systems and methods for computing a reusability index of a software asset are described herein. In typical software development organizations, a large number of already developed software assets exist which could be stored in a repository for reuse in further software development. It is not easy to identify the most desirable asset from such a large number of existing software assets. The existing approaches of identifying the most desirable asset mainly focus on the quality of programming, which is not a sufficient characteristic to properly evaluate the reusability of the existing software assets.

The present subject matter describes a systematic approach to evaluate the reusability of the existing software assets in clear and measurable terms. According to the present subject matter, a reusability index is associated with every software asset present in the repository of reusable software assets. The reusability index is a numeric value assigned to a software asset that indicates how good the software asset is in terms of its reusability potential as compared to other software assets in the repository of the reusable software assets. The reusability index is computed based on several predefined characteristics of the reusable software asset which have an effect on reusability. A characteristic score is received for each of the predefined characteristics. These predefined characteristics are grouped into multiple dimensions, i.e., every dimension has one or more predefined characteristics associated with it. The characteristic scores of the predefined characteristics grouped in a particular dimension are used to determine, based on a characteristic weighing criterion, a dimension score for that dimension. Further, the dimension score of each dimension is used to compute, based on a dimension weighing criterion, the reusability index of the software asset. This reusability index can be utilized to effectively realize the reuse of software assets. The use of multiple characteristics and dimensions to determine the reusability index is to evaluate the reusability of software assets from multiple perspectives and thus in a more comprehensive and complete manner as compared with the existing approaches.

While aspects of described systems and methods for computing reusability index of software assets may be implemented in any number of different computing systems, environments, and/or configurations, the embodiments are described in the context of the following exemplary systems.

Figure 1:
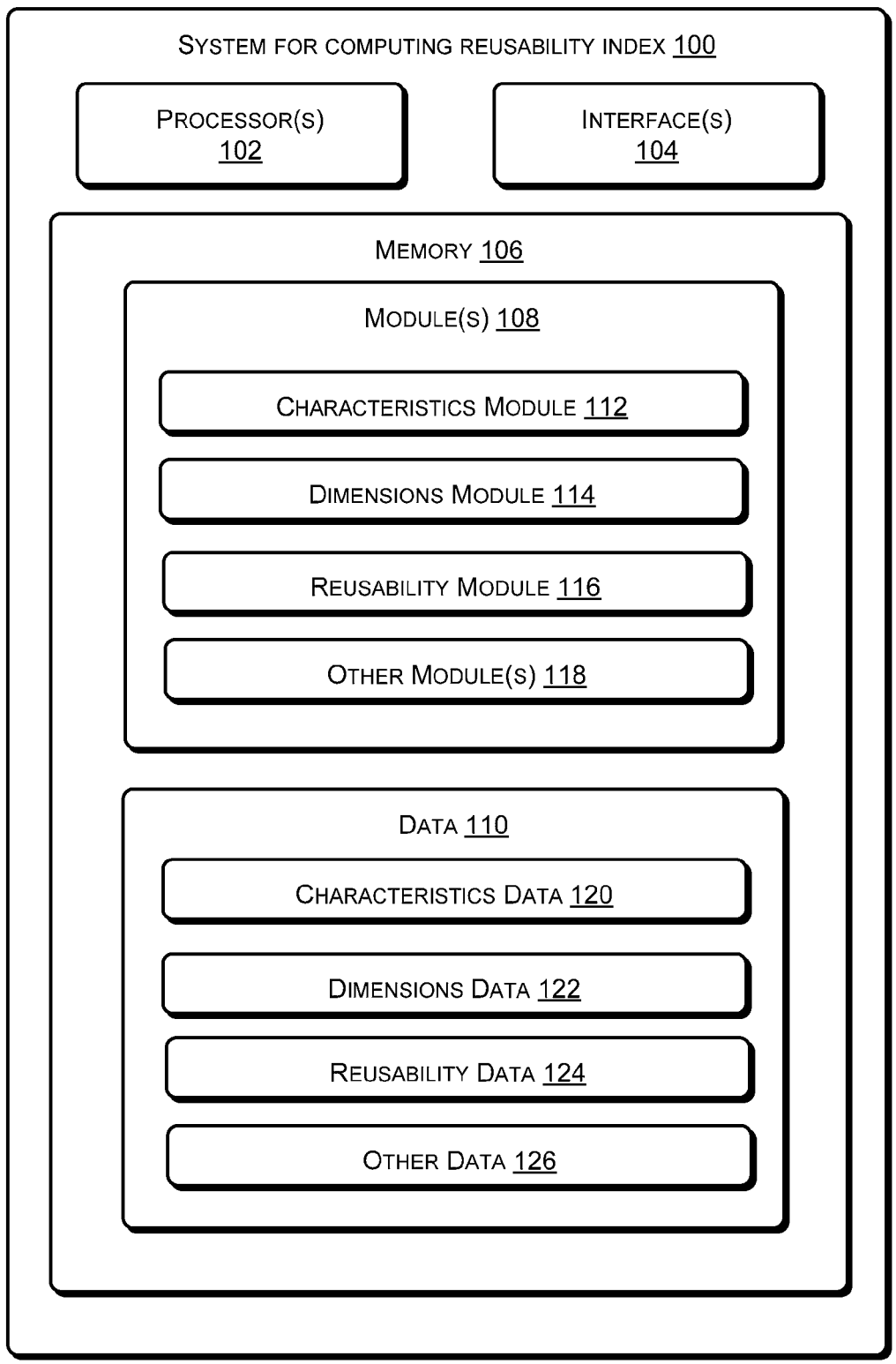
FIG. 1 illustrates a system for computing a reusability index of a software asset, in accordance with an embodiment of the present subject matter.

Referring now to FIG. 1, a system for computing a reusability index of a software asset 100, hereinafter referred as system 100, is illustrated, in accordance with an embodiment of the present subject matter. The system 100 may include at least one processor 102, an I/O interface 104, and a memory 106. The at least one processor 102 may be implemented as one or more microprocessors, microcomputers, microcontrollers, digital signal processors, central processing units, state machines, logic circuitries, and/or any devices that manipulate signals based on operational instructions. Among other capabilities, the at least one processor 102 is configured to fetch and execute computer-readable instructions stored in the memory 106.

The I/O interface 104 may include a variety of software and hardware interfaces, for example, a web interface, a graphical user interface, and the like. The I/O interface 104 may allow the system 100 to interact with a user. Further, the I/O interface 104 may enable the system 100 to communicate with other computing devices, such as web servers and external data servers (not shown). The I/O interface 104 can facilitate multiple communications within a wide variety of networks and protocol types, including wired networks, for example, LAN, cable, etc., and wireless networks, such as WLAN, cellular, or satellite. The I/O interface 104 may include one or more ports for connecting a number of devices to one another or to another server.

The memory 106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 106 may include modules 108 and data 110. The modules 108 include routines, programs, objects, components, data structures, etc., which perform particular tasks or implement particular abstract data types. In one implementation, the modules 108 may include a characteristics module 112, a dimensions module 114, reusability module 116, and other module(s) 118. The other module(s) 118 may include programs or coded instructions that supplement applications and functions of the system 100. The data 110, amongst other things, serves as a repository for storing data processed, received, and generated by one or more of the modules 108, such as characteristics data 120, dimensions data 122, and reusability data 124. The data 110 may also include other data 126. The other data 126 may include data generated as a result of the execution of one or more modules in the other module 118.

Every software asset which could be reused includes certain characteristics, such as value related characteristics and usage related characteristics. The examples of value characteristics include effort in creating the software asset, actual savings from reusing the software asset, technical expertise required to build a similar software asset. Whereas the examples of usage characteristics include number of reuses in past, number of comments provided by reusers in past, and number of queries asked by reusers in past. There could be other characteristics as well. The examples of other characteristics include characteristics related to technology trends, reputation of creator or creator's group. In one implementation, the characteristics module 112 is configured to receive a characteristic score for each of such predefined characteristics of the software asset to be reused. In one example, the characteristics module 112 receives a characteristic score of 3 from possible values of 0 to 5 for a predefined characteristic, say C1. In this example, the characteristics module 112 also receives characteristic scores for other predefined characteristic, say C2, C3 . . . and so on. In one implementation, the characteristics module 112 is further configured to store the characteristic score of each of the predefined characteristics in the characteristics data 120.

In one implementation, the characteristics module 112 is further configured to scale the characteristic scores in a standard range, such as 0 to 100. In the previous example, the characteristic score of 3 in the range of 0 to 5 is scaled to 60 in the range of 0 to 100. A scaling factor may be used for same. In the previous example, the scaling factor is equal to 20, i.e., the range 0 to 5 multiplied by the scaling factor equal to 20 becomes the range of 0 to 100. The advantage of scaling the characteristic scores in the standard range is that the effect of different measuring units and ranges for the predefined characteristics (C1, C2, C3 . . . and so on) is nullified.

In one implementation, the characteristics module 112 is configured to convert a characteristic score associated with a characteristic of a reusable software asset in a percentile form based on comparison with the characteristic scores associated with the same characteristic of other reusable software assets in a repository. In the previous example, the characteristic score of 3 is, say, 90 in percentile format if 90% of the other software assets are having the characteristic score less than 3.

Furthermore, every software asset which could be reused includes multiple predefined dimensions (D1, D2, D3 . . . and so on). Here each predefined dimension includes a set of above mentioned predefined characteristics which are related with each other. In other words, every predefined dimension has one or more the above mentioned predefined characteristics associated with it. For example, dimension D1 includes, say three characteristics namely C1, C2, and C3.

In one implementation, the dimensions module 114 is configured to determine a dimension score for each of the predefined dimensions. The dimensions module 114 determines the dimension score for a dimension from the characteristic scores of characteristics associated with that dimension. For example, the dimension score for dimension D1 can be determined from the characteristic scores of characteristics associated with that dimension which are C1, C2, and C3. In one implementation, the dimensions module 114 is further configured to store the dimension score for each of the predefined dimensions in the dimensions data 122.

In one implementation, the dimensions module 114 is configured to give more weightage to certain characteristics based on a characteristics weighing criterion for determining the dimension score of a dimension. In one example, the dimensions module 114 is configured to determine the dimension score of the dimension D1 as:

$$D1=(x*C1+y*C2+z*C3)/(x+y+z) \qquad (1)$$

Here, each characteristic, i.e., C1 to C3, represents a corresponding characteristic score. Further, the characteristic scores are weighted as per a characteristic weighing criterion using coefficients x, y, & z. Organizations may choose these coefficients depending on its business priorities. In one implementation the reusability module 116 is configured to compute the reusability index of the software asset based on the dimension scores for the predefined dimensions, say D1 to D7. In one example, the reusability module 116 can be configured to compute the reusability index (RI) of the software asset as:

$$RI=(a*D1+b*D2+c*D3+d*D4+e*D5+f*D6+g*D7)/\\a+b+c+d+e+f+g) \qquad (2)$$

Here, each dimension, i.e., D1 to D7, represents a corresponding dimension score each of which is determined from one or more characteristic scores. Further, the dimension scores are weighted as per a dimension weighing criterion using coefficients a, b, c, d, e, f, & g to compute the reusability index. Organizations may choose these coefficients depending on its business priorities. In one implementation, the reusability module 116 is further configured to store the reusability index in the reusability data 124.

In an embodiment of the present subject matter, the various dimensions, for example, D1 to D7, alone are also very useful in evaluating the reusability of software assets, i.e., even without computing the reusability index, two software assets can be compared for reusability purposes based on their dimension scores only. In said embodiment, corresponding dimension scores of the two software assets can be compared for evaluating the reusability. For example, value related characteristics of two software assets may be utilized to determine respective dimensions scores which can be compared with each other directly to relatively evaluate the reusability of the software assets from value perspective. Whereas in previous embodiments, the reusability index indicates the reusability of the software asset which is based on the combined effect of various dimensions or perspectives.

In an embodiment of the present subject matter, some of the predefined characteristics and thus the associated dimensions vary over time. Therefore, the characteristics module 112 is configured to periodically receive the characteristic scores and store it in characteristics data 120. Accordingly, the dimensions module 114 is also configured to periodically determine the dimension scores from the updated characteristic scores and store it in dimensions data 122. Furthermore, the reusability module 116 is also configured to periodically compute the reusability index from the updated dimension scores and store it in reusability data 124. In said embodiment, every time a user searches the repository of software assets, a recent most reusability index can be indicated along with the software assets on a graphical user interface, such as interface 104.

In an embodiment of the present subject matter, some of the predefined characteristics and thus the associated dimensions are event triggered. For example, the download of a software asset for reuse purposes is an event that increases the number of downloads by one. Therefore, a dimension utilizing the number of downloads as a characteristic has a different dimension score. Accordingly, the reusability index also changes. Therefore, the characteristics module 112, the dimensions module 114, and the reusability module 116 may be configured to be triggered by such events.

Figure 2:
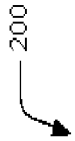
FIG. 2 illustrates a hierarchy of dimensions and characteristics for computing a reusability index of a software asset, in accordance with an embodiment of the present subject matter.

Referring now to FIG. 2, a hierarchy 200 of predefined dimensions and associated characteristics is illustrated, in accordance with an embodiment of the present subject matter. The hierarchy 200 includes seven predefined dimensions which are metadata dimension (MD) 202, quality dimension (QD) 204, usage dimension (UD) 206, friction dimension (FD) 208, value dimension (VD) 210, currency dimension (CD) 212, and reputation dimension (RD) 214. It would be appreciated by a person skilled in the art here that the hierarchy 200 is scalable in respect of adding new dimensions and many other dimensions may be included as and when required.

Each of the above mentioned dimensions includes one or more characteristics of the software asset which have an effect on the reusability of the software asset. Examples of the such characteristics include correctness 216, completeness 218, quality of design and programming 220, violations 222, evaluations 224, downloads 226, recency rank 228, queries rank 230, comments rank 232, owner permission 234, development license 236, runtime license 238, creation effort 240, average actual savings 242, technical expertise level 244, technology heat 246, domain heat 248, version currency 250, bookmarks rank 252, referrals rank 254, rating before use 256, ratings after use 258, asset age 260, answered queries 262, quality for creator 264, and usage for creator 266. It would be appreciated by a person skilled in the art here that the hierarchy 200 is scalable in terms of adding new characteristics to existing dimensions and many other characteristics may be included in the existing dimensions as and when required. The above mentioned dimensions and characteristics associated with the above mentioned dimensions are described below in detail.

Metadata Dimension (MD) 202

This dimension indicates how well the reusable software asset can be identified for reuse based on metadata, such as tags associated with reusable software asset. For identification purposes, all reusable software assets are generally tagged with tags based on technology and functional domain. The metadata dimension includes two characteristics: (1) correctness 216 and (2) completeness 218. The correctness 216 is indicative of correctness of tags tagged to the software asset based on the technology and functional domains. In one example, correctness 216 of tagging can have a characteristic score in a range of 0 to 3, wherein 0 represents no tag is correct; 1 represents some, e.g., less than 50%, tags are correct; 2 represents most, e.g., more than 50%, tags are correct; and 3 represents all tags are correct. Whereas, the completeness 218 is indicative of completeness of tags tagged to the software asset based on the technology and functional domains. Similarly, completeness 218 of tagging can also have a characteristic score in a range of 0 to 3, wherein 0 represents no tag is present; 1 represents some, e.g., less than 50%, tags are present; 2 represents most, e.g., more than 50%, tags are present; and 3 represents all tags are present. In one implementation, the characteristic scores of correctness 216 and completeness 218 are weighted according to a characteristic weighing criterion and used to determine a dimension score for metadata dimension 202. In one example, the dimension score for metadata dimension 202 is determined from the equation:

$$MD = (a^* \text{correctness} + b^* \text{completeness})^* 33/(a+b) \quad (3)$$

Here, 33 is a scaling factor used to extend the range from 0-3 to 0-100 approximately, i.e., range 0 to 3 multiplied by the scaling factor 33 is equal to range 0 to 99 which is range 0 to 100 approximately. In one example, the coefficient a and b have a value equal to one, i.e., both characteristics are given equal weightage in determining dimension score for metadata dimension 202.

For readability, the same set of coefficients, i.e., a, b, c . . . so on, is used hereinafter for determining dimension scores for other dimensions. However, the coefficient values may be chosen differently for the other dimensions.

Quality Dimension (QD) 204

This dimension indicates the quality of the software asset for reuse purposes. This dimension does not generally change over time. In one example, only one characteristic is associated with this dimension, which is the quality of design and programming 220 of the reusable software asset. In one example, the characteristic score for this characteristic can be in any range and can be then scaled to the standard range of 0 to 100 if required. In said example, the dimension score would be same as the characteristic score. In one implementation, one or more quality related characteristics can be included in the quality dimension 204.

Usage Dimension (UD) 206

This dimension indicates how reusable earlier reusers consider a software asset based on actual reuse and evaluation. This dimension measures the reuse frequency and reuse feedback of the software asset. This dimension keeps changing over time with every reuse. This dimension comprises of several characteristics, such as violations 222, evaluations 224, downloads 226, recency rank 228, queries rank 230, and comments rank 232.

Violations 222 represent potential violations of intellectual property rights (IPR) on the reuse of a particular software asset. This characteristic is to check whether a reusable software asset is non-compliant to any IPR policy of organizations. In one example, the characteristic score can be 0 if it is non-compliant and 1 if compliant. The characteristic score for this characteristic can be set by a reviewer or a reuser at any point in time.

The characteristic scores of the following characteristics are converted in percentiles from comparison with characteristic scores of corresponding characteristics of other assets in the repository.

Evaluations 224 represent the number of times reusers have evaluated the software asset in past in terms of its fitness level for reuse purpose. The evaluation of the software asset can be done from supporting documents, but not necessarily from the coding in the software asset. The evaluation of the software asset is a step that precedes download of the software asset for reuse purpose and indicates initial fitness level of the software asset for reuse purpose. In other words, evaluation of the software asset is preliminary and quick reusability analysis of a software asset from its supporting documents.

Downloads 226 represent the number of times the software asset has been downloaded in past after evaluation from supporting documents. It indicates a higher level of the fitness for reuse purpose. In one example, if a reuser considers the software asset unfit for reuse purpose after evaluating it, then the reuser will not download it. In another example, if the reuser considers the software asset fit for reuse purpose after evaluating it, then the reuser will download it for further consideration.

Recency rank 228 represents the number of times the software asset has been downloaded in the recent months. The number of recent months has to be chosen appropriate to the software asset usage requirements of the organization. In one example, the number of recent may be 6, while in other it may be 3 depending upon business priorities.

Queries rank 230 represents the number of queries on the software asset asked by reusers. This characteristic indicates activity level for the software asset.

Comments rank 232 represents the number of comments made by users on the software asset. This characteristic also indicates activity level for the software asset.

In one example, the dimension score for the usage dimension 206 is determined from the following equation:

$$UD=\text{violations}*[a*\text{queries rank}+b*\text{recency rank}+c*\text{comments rank}+d*(\text{downloads/evaluations}) \text{rank}]/(a+b+c+d) \quad (4)$$

Here the fraction downloads/evaluations is also converted into percentile form.

Friction Dimension (FD) 208

This dimension measures friction in the ease of reuse as imposed by certain characteristics which are not related to the programming limitations of the software assets, such as owner permission 234, development license 236, runtime license 238. In one example, each of these characteristic can have a characteristic score of either 0 or 3. For example, 3 when no owner permission is required, 0 when owner permission is required. Similarly, 3 when no development license is required, 0 when development license is required. Similarly, 3 when no runtime license is required, 0 when runtime license is required. The dimension score for the friction dimension 208 is determined from the following equation in a range of 0 to 100:

$$FD=(a*\text{owner permission}+b*\text{development license}+c*\text{runtime license})*33/(a+b+c) \quad (5)$$

Here, 33 is a scaling factor used to extend the range from 0-3 to 0-100 approximately, i.e., the range 0-3 multiplied by the scaling factor 33 is equal to range 0-99 which is range 0-100 approximately. In one example, the coefficient a, b, & c have a value 1, 2, & 3 respectively, i.e., runtime license 238 has more weightage than development license 236 and development license 236 has more weightage than owner permission 234.

Value Dimension (VD) 210

This dimension indicates the potential savings that can be made by reusing the software asset. The potential savings are estimated by creator and by every reuser by giving feedback after reuse. This dimension also considers the depth of technical knowledge required to build the software asset. This dimension is made up of three characteristics (1) creation effort 240 in person days as given by the creator of the software asset; (2) average actual savings 242 in person days as reported by reusers of the software asset; (3) technical expertise level 244 required to conceptualize and develop the software asset. The technical expertise level 244 allows marking up the effort when deep technology knowledge is required to build the software asset. The average actual savings 242 can be scaled based on the technical expertise level 244 required to create the software asset. In other words, a higher characteristic score for technical expertise level 244 increases the savings value. In one example, the characteristic score for technical expertise level 244 in a technical area is 0 for normal expertise (e.g. less than 3 years of experience required in the technical area), 1 for medium expertise (e.g. 3 to 5 years of experience required in the technical area), 2 for high expertise (e.g. 5 to 8 years of experience required in the technical area), and 3 for very high expertise (e.g. more than 8 years of experience required in the technical area). The dimension score for the value dimension 210 is determined from the following equation:

$$VD=\text{percentile of }[(a*\text{creation effort}+b*\text{average actual savings})/(a+b)*(1+c*\text{technical expertise level})] \quad (6)$$

In one example, the coefficient a, b, & c all have a value 1, 1, & 0.15, i.e., creation effort 240 and average actual savings 242 have equal weightage, but higher than weightage of technical expertise level 244.

Currency Dimension (CD) 212

This dimension indicates how hot, i.e., in demand, the technology and domain of the software asset are. This dimension also indicates how current the technology version is. Technology versions such as programming language version are maintained by the developing organization. The software asset technology version is checked with these versions to determine the version currency. This dimension gradually changes over time and has to be periodically determined. This dimension has three characteristics: (1) technology heat 246 which can have characteristic score for a particular technology as 0 for cold, i.e., not attractive technology (e.g. there are no sales forecast for this technology in an organization), 1 for warm technology (e.g. there are less than 5% sales forecast for this technology in the organization), 2 for hot technology (e.g. there are 5 to 15% sales forecast for this technology in the organization), and 3 for very hot, i.e., very attractive technology (e.g. more than 15% of sales forecast for this technology in the organization); (2) domain heat 248 which can have characteristic score for a particular domain as 0 for cold, i.e., not attractive domain (e.g. there are no sales forecast for this domain in an organization), 1 for warm domain (e.g. there are less than 5% sales forecast for this domain in the organization), 2 for hot domain (e.g. there are 5 to 15% sales forecast for this domain in the organization), and 3 for very hot, i.e., very attractive domain (e.g. more than 15% of sales forecast for this domain in the organization); and (3) version currency 250 which can have characteristic score 0 for an outdated version (e.g. more than 5 versions away from a current version), 1 for old version (e.g. 2 to 5 versions away from the current version), 2 for recent version (e.g. less than 2 versions away from the current version), and 3 for the current version. In one implementation, the number of versions for deciding the characteristic score for version currency 250 is based on the technology as a developing technology may undergo version changes more rapidly than a developed technology. The dimension score for the currency dimension 212 is determined from the following equation:

$$CD = (a*\text{technology heat} + b*\text{domain heat} + c*\text{version currency})*33/(a+b+c) \quad (7)$$

Here, 33 is a scaling factor used to extend the range from 0-3 to 0-100 approximately, i.e., the range 0-3 multiplied by the scaling factor 33 is equal to the range 0-99 which is the range 0-100 approximately. In one example, the coefficient a, b, & c all have a value one, i.e., all three characteristics are given equal weightage.

Reputation Dimension (RD) 214

This dimension indicates how reliable the software asset may be based on the software asset's reputation and its creator's reputation. The software asset reputation is ranked by considering characteristics such as "Referrals" made by reusers. The creator reputation is ranked by averaging the reputation of all assets created by the creator. The age of the current version of the software asset indicates its stability. A relatively less stable asset would have got modified and released later—reducing its age. This dimension also gradually changes over time as the age of the software asset changes and has to be periodically determined. In one example, the reputation dimension is made up of two sub-dimensions (1) asset reputation (ARSD) 268 and (2) creator's reputation (CRSD) 270. In one example, dimension score for reputation dimension 214 is determined from the following equation:

$$RD = \sqrt{(1+ARSD)*CRSD} \quad (8)$$

Asset reputation sub dimension (ARSD) 268 is determined from the following equation:

$$ARSD = (a*\text{bookmarks rank} + b*\text{referrals rank} + c*\text{ratings\_before use}*20 + d*\text{ratings after use}*20 + e*\text{asset age}*33)/(a+b+c+d+e) \quad (9)$$

In one example, the coefficient a, b, c, d & e have values 0.5, 1, 1, 2, & 1, i.e., asset age has highest weightage, whereas bookmarks rank has lowest weightage.

Bookmarks rank 252 represents the number of users who have bookmarked this asset and this number is then converted to percentile in the repository. This characteristic indicates usefulness of the software asset.

Referrals rank 254 represents the number of times users have referred this asset to other users and this number is then converted to percentile in the repository. This characteristic also indicates usefulness of the software asset.

Ratings before use 256 represents the rating given by users who have evaluated the software asset from supporting documents without testing the actual code of the software asset. This characteristic indicates initial fitness level for reuse purpose. In one example, this characteristic includes characteristic score in a range of 0 to 5, here 0 represents no rating, 1 represents very low rating (e.g. less than 20% suitability to requirements), 2 represents low rating (e.g. 20 to 40% suitability to the requirements), 3 represents medium rating (e.g. 40 to 60% suitability to the requirements), 4 represents high rating (e.g. 60 to 80% suitability to the requirements), 5 represents very high rating (e.g. more than 80% suitability to the requirements). This characteristic is scaled to a range of 0-100 using a scaling factor equal to 20 when determining the dimension score for sub-dimension ARSD 268.

Ratings after use 258 represents the rating given by users who have tried out the actual code after the evaluation. In one example, this characteristic includes characteristic score in a range of 0 to 5, here 0 represents no rating, 1 represents very low rating (e.g. less than 20% suitability to requirements), 2 represents low rating (e.g. 20 to 40% suitability to the requirements), 3 represents medium rating (e.g. 40 to 60% suitability to the requirements), 4 represents high rating (e.g. 60 to 80% suitability to the requirements), 5 represents very high rating (e.g. more than 80% suitability to the requirements). This characteristic is also scaled to a range of 0-100 using a scaling factor equal to 20 when determining the dimension score for sub-dimension ARSD 268.

Asset age 260 represents the age of current version of the software asset. This characteristic signifies stability of the software asset. For example, a relatively less stable software asset is modified frequently and has to be rereleased, thereby reducing its age. The characteristic score can be in a range of 0-3. The thresholds for each level have to be set by the organization appropriate to the nature of business. In one example, the characteristic score can be 0 for new (e.g. 0 to 1 month old), 1 for recent (e.g. 1-6 months old), 2 for medium (e.g., 6 months to 2 years), and 3 for long (e.g. more than 2 years). This number is scaled to 0-100 when computing the characteristic score.

Creator's reputation sub dimension 270 is determined from the following equation:

$$CRSD = (f*\text{answered queries} + g*\text{average quality for creator} + h*\text{average usage for creator})/(f+g+h) \quad (10)$$

In one example, the coefficient f, g, & h all have a value one, i.e., all three characteristics are given equal weightage.

Answered queries 262 represent the percentage of user queries that have been resolved by the creator of this asset.

Quality for a creator 264 represents average asset quality for all the software assets previously created by that creator in a scaled range of 0-100. In one implementation, the characteristic score for this dimension is determined from the dimension score of the quality dimension 204.

Usage for a creator 266 represents average asset usage for all the software assets previously created by that creator in a scaled range of 0-100. In one implementation, the characteristic score for this dimension is determined from the dimension score of the usage dimension 206.

In one embodiment, taking into account the importance of intellectual property rights now a days, the reusability index (RI) may be computed as:

$$RI = \text{violations}*(a*MD + b*QD + c*UD + d*FD + e*VD + f*CD + g*RD)/(a+b+c+d+e+f+g) \quad (11)$$

Here, violations characteristic has a value 0 if the software asset in non-compliant to IPR policy of organization and 1 if compliant. In other words, the reusability index of an asset is considered only when it is compliant to IPR policy of organization, otherwise it is left out.

In an embodiment, the predefined characteristics are either time or event variant as discussed earlier. Examples of time variant characteristics include technology heat (246), domain heat (248), version currency (250), asset age (260), etc. The dimensions using these time variant characteristics are also time variant. Examples of event variant characteristics include correctness (216), completeness (218), violations (222), evaluations (224), downloads (226), recency rank (228), queries rank (230), comments rank (232), bookmarks rank (252), referrals rank (254), rating before use (256), ratings after use (258), answered queries (262), quality for creator (264), and usage for creator (266), etc. The dimensions using these event variant characteristics are also event variant.

Figure 3:
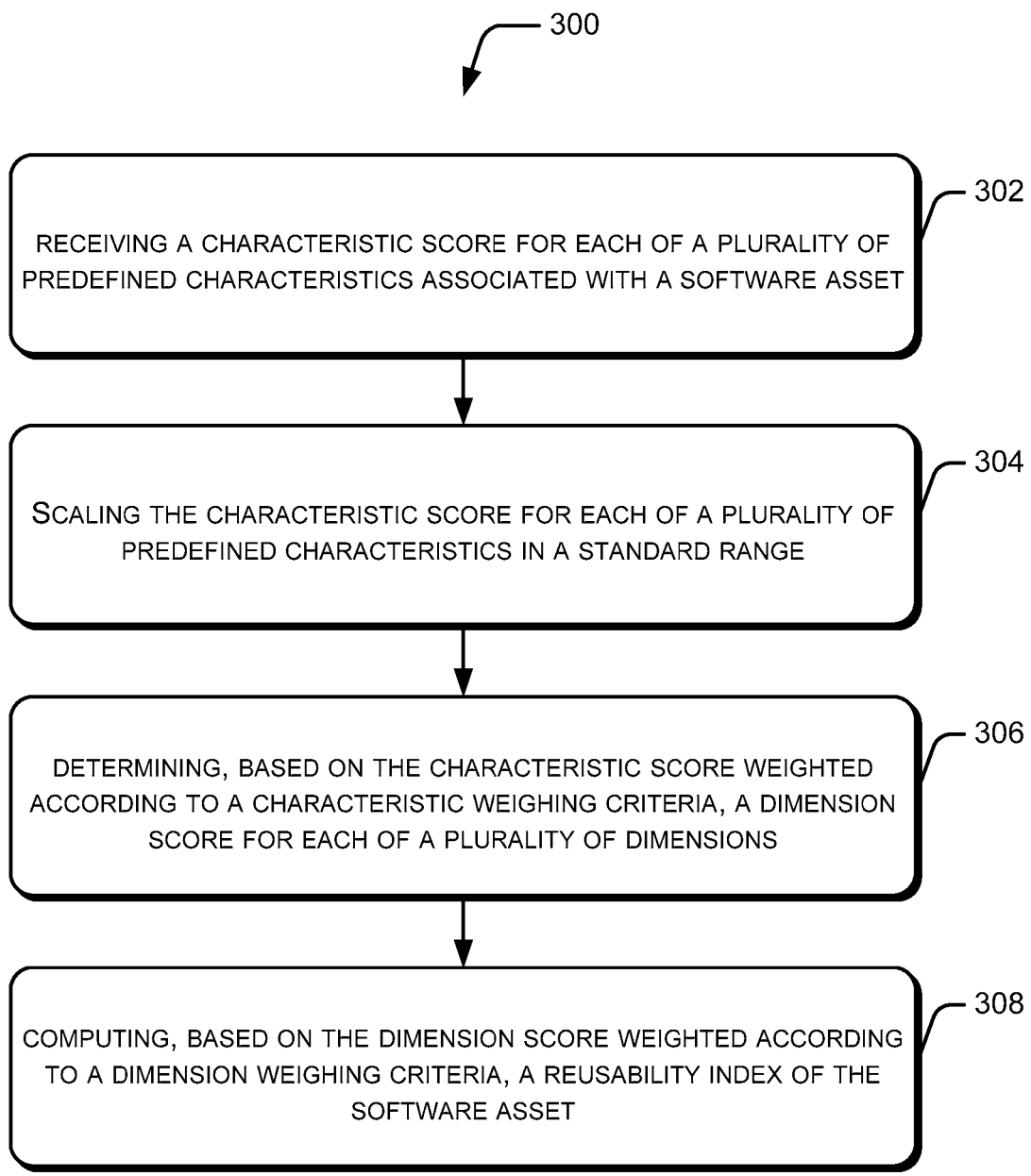
FIG. 3 illustrates a method for computing a reusability index of a software asset, in accordance with an embodiment of the present subject matter.

Referring now to FIG. 3, a method 300 for computing a reusability index of a software asset is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 100.

At block 302, a characteristic score for each of a plurality of predefined characteristics is received. Every reusable software asset has these predefined characteristics, say $C1$ to $C9$, which have an effect on its reusability. A characteristic score for each of such predefined characteristic is received. In one implementation, certain predefined characteristics are classified as time variant, whereas certain are classified as event variant. Therefore, the characteristic score for such characteristics may be received on triggering of a time based trigger or event based trigger.

At block 304, the characteristic score for each of a plurality of predefined characteristics is scaled in a standard range. In one implementation, all the characteristic scores are scaled in a standard range of 0 to 100, for further processing. In cases, where the characteristic scores are unbounded, i.e., can have any value, for example, download count can have any value depending upon the number of downloads, then in such cases the characteristic scores can be converted in percentiles, thus giving a ranking relative to the other software assets within the repository.

At block 306, a dimension score for each of a plurality of predefined dimensions is determined based on the received characteristic scores. The predefined characteristics, $C1$ to $C9$, are grouped into the plurality of dimensions (say $D1$ to $D3$), i.e., each dimension has one or more characteristics associated with it. For example, $D1$ has $C1$ to $C3$ associated with it, $D2$ has $C4$ to $C6$, and $D3$ has $C7$ to $C9$. In one implementation, the dimension score for each dimension is determined based on the characteristic scores weighted according to a characteristic weighing criterion. For example, the dimension score for dimension $D1$ is $(a*C1+b*C2+c*C3)/(a+b+c)$. Here, coefficients a, b, & c represents weights. The characteristic weighing criterion, particularly, the coefficients a, b, & c may be chosen depending upon the business priorities of organizations. Furthermore, the coefficients may have different values for different dimensions. For example, the dimension score for dimension $D2$ is $(x*C4+y*C5+z*C6)/(x+y+z)$. In one example, the hierarchy of dimensions and characteristics is similar to as explained for FIG. 2 and dimension scores are determined accordingly. In one implementation, the dimension scores determined for corresponding dimensions of two software assets can be directly compared with each other to evaluate the reusability of the software assets from the perspective of dimension under consideration. For example, usage related characteristics of two software assets may be utilized to determine respective dimensions scores which can be compared with each other directly to relatively evaluate the reusability of the software assets from usage perspective.

At block 308, the reusability index is computed from the dimension scores. The reusability index is numeric value that indicates the reusability of the software asset. The dimension scores ($D1$ to $D3$) can be weighted according to dimension weighing criterion. In one example, the reusability index is computed as $(r*D1+s*D2+t*D3)/(r+s+t)$. The dimensions weighing criterion, particularly, the coefficients r, s, & t may be chosen depending upon the business priorities of organizations. In one example, the hierarchy of dimensions and characteristics is similar to as explained for FIG. 2 and reusability index is determined according to equation (4).

Although implementations for methods and systems for computing a reusability index for a software asset have been described in language specific to structural features and/or methods, it is to be understood that the appended claims are not necessarily limited to the specific features or methods described. Rather, the specific features and methods are disclosed as examples of implementations for computing the reusability index of the software asset.

We claim:

1. A method of computing a reusability index of a software asset, the method comprising:
    receiving a characteristic score for each of a plurality of predefined characteristics associated with the software asset from a repository;
    determining, by a processor, a dimension score for each of a plurality of predefined dimensions comprising a usage dimension and a reputation dimension, wherein:
        the dimension score for the usage dimension is determined based on a weighted average of the characteristic score received for an evaluations characteristic and for at least three of a violations characteristic, a downloads characteristic, a recency rank characteristic, a queries rank characteristic, and a comments rank characteristic, from among the plurality of predefined characteristics, wherein:
            the evaluations characteristic is indicative of number of times reusers have evaluated the software asset in past, the violations characteristic is indicative of potential violations of intellectual property rights on reuse of the software asset, the downloads characteristic is indicative of number of times the software asset is downloaded in past, the recency rank characteristic is indicative of number of times the software asset is downloaded in recent months, the queries rank characteristic is indicative of number of queries on the software asset asked by reusers, and the comments rank characteristic is indicative of number of comments made by users on the software asset; and the dimension score for the reputation dimension is determined based on a weighted average of the characteristic score received for a bookmarks rank characteristic and for at least two of a referrals rank characteristic, a rating before use characteristic, a ratings after use characteristic, an asset age characteristic, an answered queries characteristic, a quality for creator characteristic, and a usage for creator characteristic, from among the plurality of predefined characteristics, wherein:

the bookmarks rank characteristic is indicative of percentile number of users who have bookmarked the software asset, the referrals rank characteristic is indicative of number of times users have referred the software asset to other users, the rating before use characteristic is indicative of rating given by users without testing the software asset, the ratings after use characteristic is indicative of rating given by users after testing of the software asset, the asset age characteristic is indicative of age of current version of the software asset, the answered queries characteristic is indicative of percentage of user queries that have been resolved, the quality for creator characteristic is indicative of average asset quality of other software assets created by a creator of the software asset, and the usage for creator characteristic is indicative of average asset usage for other software assets created by a creator of the software asset; and computing, by the processor, the reusability index of the software asset based on the dimension score for the plurality of predefined dimensions weighted according to a dimension weighing criterion, wherein the reusability index indicates reusability of the software asset.

2. The method as claimed in claim 1, further comprising scaling the characteristic score for each of the plurality of predefined characteristics associated with the software asset in a standard range based on a scaling factor.

3. The method as claimed in claim 2, wherein the scaling includes converting the characteristic score in percentile based on comparison of the characteristic score with corresponding characteristic scores of other software assets.

4. The method as claimed in claim 1, wherein the reusability index is amended based on potential violations of intellectual property rights.

5. The method as claimed in claim 1, wherein the plurality of predefined dimensions further comprises a metadata dimension, and wherein the dimension score for the metadata dimension is determined based on a weighted average of the characteristic score received for a completeness characteristic and a correctness characteristic, wherein:

the completeness characteristic is indicative of completeness of tags tagged to the software asset and the correctness characteristic is indicative of correctness of tags tagged to the software asset based on technology and functional domains, from among the plurality of predefined characteristics.

6. The method as claimed in claim 1, wherein the plurality of predefined dimensions further comprises a friction dimension, and wherein the dimension score for the friction dimension is determined based on a weighted average of the characteristic score received for an owner permission characteristic, a development license characteristic, and a runtime license characteristics, from among the plurality of predefined characteristics, wherein:

the owner permission characteristic is indicative of whether an owner permission is required for the software asset, the development license characteristic is indicative of whether a development license is required for the software asset, and the runtime license characteristic is indicative of whether a runtime license is required for the software asset.

7. The method as claimed in claim 1, wherein the plurality of predefined dimensions further comprises a value dimension, and wherein the dimension score for the value dimension is determined based on a weighted average of the characteristic score received for a creation effort characteristic, an average actual savings characteristic, and a technical expertise level characteristics, from among the plurality of predefined characteristics, wherein:

the creation effort characteristic is indicative of effort for creation of the software asset as reported by a creator, the average actual savings characteristic is indicative of effort saved as reported by reusers of the software asset, and the technical expertise level characteristic is indicative of a level of technical expertise required to conceptualize and develop the software asset, from among the plurality of predefined characteristics.

8. The method as claimed in claim 1, wherein the plurality of predefined dimensions further comprises a currency dimension, and wherein the dimension score for the currency dimension is determined based on a weighted average of the characteristic score received for a technology heat characteristic, a domain heat characteristic, and a version currency characteristics, from among the plurality of predefined characteristics, wherein:

the technology heat characteristic is indicative of a level of popularity of technology of the software asset, the domain heat characteristic is indicative of a level of popularity of domain of the software asset, and the version currency characteristic is indicative of how recent is this version of the software asset, from among the plurality of predefined characteristics.

9. The method as claimed in claim 1, wherein the dimension score for at least one of the plurality of dimensions is compared with a corresponding dimension score for a second software asset to evaluate reusability of the software asset.

10. A system for computing a reusability index of a software asset, the system comprising:

a processor; and a memory coupled to the processor, the memory comprising:

a characteristics module configured to receive a characteristic score for each of a plurality of predefined characteristics associated with the software asset from a repository;

a dimensions module configured to determine a dimension score for each of a plurality of predefined dimensions comprising a usage dimension and a reputation dimension, wherein:

the dimension score for the usage dimension is determined based on a weighted average of the characteristic score received for an evaluations characteristic and for at least three of a violations characteristic, a downloads characteristic, a recency rank characteristic, a queries rank characteristic, and a comments rank characteristic, from among the plurality of predefined characteristics, wherein:

the evaluations characteristic is indicative of number of times reusers have evaluated the software asset in past, the violations characteristic is indicative of potential violations of intellectual property rights on reuse of the software asset, the downloads characteristic is indicative of number of times the software asset is downloaded in past, the recency rank characteristic is indicative of number of times the software asset is downloaded in recent months, the queries rank characteristic is indicative of number of queries on the software asset asked by reusers, and the comments rank characteristic is indicative of number of comments made by users on the software asset; and the dimension score for the reputation dimension is determined based on a weighted average of the characteristic score received for a bookmarks rank characteristic and for at least two of a referrals rank characteristic, a rating before use characteristic, a ratings after use characteristic, an asset age characteristic, an answered queries characteristic, a quality for creator characteristic, and a usage for creator characteristic, from among the plurality of predefined characteristics, wherein:

the bookmarks rank characteristic is indicative of percentile number of users who have bookmarked the software asset, the referrals rank characteristic is indicative of number of times users have referred the software asset to other users, the rating before use characteristic is indicative of rating given by users without testing the software asset, the ratings after use characteristic is indicative of rating given by users after testing of the software asset, the asset age characteristic is indicative of age of current version of the software asset, the answered queries characteristic is indicative of percentage of user queries that have been resolved, the quality for creator characteristic is indicative of average asset quality of other software assets created by a creator of the software asset, and the usage for creator characteristic is indicative of average asset usage for other software assets created by a creator of the software asset; and a reusability module configured to compute the reusability index of the software asset based on the dimension score for the plurality of predefined dimensions weighted according to a dimension weighing criterion, wherein the reusability index indicates reusability of the software asset.

11. The system as claimed in claim 10, wherein the characteristics module is configured to periodically receive the characteristic score based on an age of the software asset and technology trend of the software asset.

12. The system as claimed in claim 10, wherein the characteristics module is configured to receive the characteristic score upon occurrence of an event, wherein the event causes a change in the characteristic score.

13. The system as claimed in claim 10, wherein the plurality of predefined dimensions further comprises a metadata dimension, and wherein the dimension score for the metadata dimension is determined based on a weighted average of the characteristic score received for a completeness characteristic and a correctness characteristic, wherein:

the completeness characteristic is indicative of completeness of tags tagged to the software asset and the correctness characteristic is indicative of correctness of tags tagged to the software asset based on technology and functional domains, from among the plurality of predefined characteristics.

14. The system as claimed in claim 10, wherein the plurality of predefined dimensions further comprises a friction dimension, and wherein the dimension score for the friction dimension is determined based on a weighted average of the characteristic score received for an owner permission characteristic, a development license characteristic, and a runtime license characteristic, from among the plurality of predefined characteristics, wherein:

the owner permission characteristic is indicative of whether an owner permission is required for the software asset, the development license characteristic is indicative of whether a development license is required for the software asset, and the runtime license characteristic is indicative of whether a runtime license is required for the software asset.

15. The system as claimed in claim 10, wherein the plurality of predefined dimensions further comprises a value dimension, and wherein the dimension score for the value dimension is determined based on a weighted average of the characteristic score received for a creation effort characteristic, an average actual savings characteristic, and a technical expertise level characteristic, from among the plurality of predefined characteristics, wherein:

the creation effort characteristic is indicative of effort for creation of the software asset as reported by a creator, the average actual savings characteristic is indicative of effort saved as reported by reusers of the software asset, and the technical expertise level characteristic is indicative of a level of technical expertise required to conceptualize and develop the software asset, from among the plurality of predefined characteristics.

16. The system as claimed in claim 10, wherein the plurality of predefined dimensions further comprises a currency dimension, and wherein the dimension score for the currency dimension is determined based on a weighted average of the characteristic score received for a technology heat characteristic, a domain heat characteristic, and a version currency characteristic, from among the plurality of predefined characteristics, wherein:

the technology heat characteristic is indicative of a level of popularity of technology of the software asset, the domain heat characteristic is indicative of a level of popularity of domain of the software asset, and the version currency characteristic is indicative of how recent is this version of the software asset, from among the plurality of predefined characteristics.

17. A non-transitory computer readable medium having embodied thereon a computer program for executing a method of computing a reusability index of a software asset, the method comprising:

receiving a characteristic score for each of a plurality of predefined characteristics associated with the software asset from a repository;

determining a dimension score for each of a plurality of predefined dimensions comprising a usage dimension and a reputation dimension, wherein:

the dimension score for the usage dimension is determined based on a weighted average of the characteristic score received for an evaluations characteristic and for at least three of a violations characteristic, a downloads characteristic, a recency rank characteristic, a queries rank characteristic, and a comments rank characteristic, from among the plurality of predefined characteristics, wherein:

the evaluations characteristic is indicative of number of times reusers have evaluated the software asset in past, the violations characteristic is indicative of potential violations of intellectual property rights on reuse of the software asset, the downloads characteristic is indicative of number of times the software asset is downloaded in past, the recency rank characteristic is indicative of number of times the software asset is downloaded in recent months, the queries rank characteristic is indicative of number of queries on the software asset asked by reusers, and the comments rank characteristic is indicative of number of comments made by users on the software asset; and the dimension score for the reputation dimension is determined based on a weighted average of the characteristic score received for a bookmarks rank characteristic and for at least two of a referrals rank characteristic, a rating before use characteristic, a ratings after use characteristic, an asset age characteristic, an answered queries characteristic, a quality for creator characteristic, and a usage for creator characteristic, from among the plurality of predefined characteristics, wherein:

the bookmarks rank characteristic is indicative of percentile number of users who have bookmarked the software asset, the referrals rank characteristic is indicative of number of times users have referred the software asset to other users, the rating before use characteristic is indicative of rating given by users without testing the software asset, the ratings after use characteristic is indicative of rating given by users after testing of the software asset, the asset age characteristic is indicative of age of current version of the software asset, the answered queries characteristic is indicative of percentage of user queries that have been resolved, the quality for creator characteristic is indicative of average asset quality of other software assets created by a creator of the software asset, and the usage for creator characteristic is indicative of average asset usage for other software assets created by a creator of the software asset; and computing the reusability index of the software asset based on the dimension score weighted according to a dimension weighing criterion, wherein the reusability index indicates reusability of the software asset.

18. The non-transitory computer readable medium as claimed in claim 17, wherein the plurality of predefined dimensions further comprises a friction dimension, and wherein the dimension score for the friction dimension is determined based on a weighted average of the characteristic score received for an owner permission characteristic, a development license characteristic, and a runtime license characteristics, from among the plurality of predefined characteristics, wherein:

the owner permission characteristic is indicative of whether an owner permission is required for the software asset, the development license characteristic is indicative of whether a development license is required for the software asset, and the runtime license characteristic is indicative of whether a runtime license is required for the software asset.

19. The non-transitory computer readable medium as claimed in claim 17, wherein the plurality of predefined dimensions further comprises a value dimension, and wherein the dimension score for the value dimension is determined based on a weighted average of the characteristic score received for a creation effort characteristic, an average actual savings characteristic, and a technical expertise level characteristics, from among the plurality of predefined characteristics, wherein:

the creation effort characteristic is indicative of effort for creation of the software asset as reported by a creator, the average actual savings characteristic is indicative of effort saved as reported by reusers of the software asset, and the technical expertise level characteristic is indicative of a level of technical expertise required to conceptualize and develop the software asset, from among the plurality of predefined characteristics.

20. The non-transitory computer readable medium as claimed in claim 17, wherein the plurality of predefined dimensions further comprises a currency dimension, and wherein the dimension score for the currency dimension is determined based on a weighted average of the characteristic score received for a technology heat characteristic, a domain heat characteristic, and a version currency characteristics, from among the plurality of predefined characteristics, wherein:

the technology heat characteristic is indicative of a level of popularity of technology of the software asset, the domain heat characteristic is indicative of a level of popularity of domain of the software asset, and the version currency characteristic is indicative of how recent is this version of the software asset, from among the plurality of predefined characteristics.

* * * * *